(12) United States Patent
Fender-Oberle et al.

(10) Patent No.: US 9,255,610 B2
(45) Date of Patent: Feb. 9, 2016

(54) TORQUE TRANSMISSION DEVICE

(71) Applicants: Vincent Fender-Oberle, Erstein-Krafft (FR); Hartmut Mende, Bühl (DE); Uli Junker, Offenburg (DE)

(72) Inventors: Vincent Fender-Oberle, Erstein-Krafft (FR); Hartmut Mende, Bühl (DE); Uli Junker, Offenburg (DE)

(73) Assignee: Schaeffler Technology AG & Co. KG, Herzogenaurach (DE)

(*) Notice: Subject to any disclaimer, the term of this patent is extended or adjusted under 35 U.S.C. 154(b) by 0 days.

(21) Appl. No.: 14/186,191

(22) Filed: Feb. 21, 2014

(65) Prior Publication Data

US 2014/0235360 A1  Aug. 21, 2014

Related U.S. Application Data

(63) Continuation of application No. PCT/DE2012/000754, filed on Jul. 26, 2012.

(30) Foreign Application Priority Data

Aug. 23, 2011 (DE) .................. 10 2011 081 361

(51) Int. Cl.
  *F16F 15/129* (2006.01)
  *F16D 3/12* (2006.01)
  *F16F 15/139* (2006.01)

(52) U.S. Cl.
  CPC .............. *F16D 3/12* (2013.01); *F16F 15/1395* (2013.01)

(58) Field of Classification Search
  CPC .................................. F16D 3/12; F16F 15/1395
  USPC ................................ 464/67.1, 68.2, 68.4, 68.41
  See application file for complete search history.

(56) References Cited

U.S. PATENT DOCUMENTS

| | | | |
|---|---|---|---|
| 3,296,887 A * | 1/1967 | Larsen | 464/68.41 |
| 4,537,297 A * | 8/1985 | Davies | 464/68.2 X |
| 4,638,684 A * | 1/1987 | Maucher | 464/68.2 |
| 5,935,008 A | 8/1999 | Mizukami | 464/68.41 |
| 6,048,284 A * | 4/2000 | Gerhardt et al. | |
| 8,651,965 B2 * | 2/2014 | Amano et al. | 464/68.2 X |
| 2006/0185959 A1 | 8/2006 | Tsuruta et al. | 192/214 |
| 2010/0210366 A1 | 8/2010 | Droll et al. | 464/68.41 |
| 2011/0099992 A1 * | 5/2011 | Magerkurth et al. | |
| 2014/0374207 A1 * | 12/2014 | Amano | |

* cited by examiner

*Primary Examiner* — Gregory Binda
(74) *Attorney, Agent, or Firm* — Alfred J. Mangels

(57) ABSTRACT

A torque transmission device for a drive train of a motor vehicle driven by an internal combustion engine. The device includes an input part and an output part having a common axis of rotation around which the input part and the output part are jointly rotatable relative to one another, and a spring damper arrangement that has at least one energy storage device. A friction device is effective between the input part and the output part and is arranged radially outside the at least one energy storage device, in order to provide a torque transmission device having a construction that is optimized with respect to the installation space.

15 Claims, 5 Drawing Sheets

TORQUE TRANSMISSION DEVICE

CROSS-REFERENCE TO RELATED APPLICATION

This application is a continuation of International Application Serial No. PCT/DE2012/000754, having an international filing date of 26 Jul. 2012, and designating the United States, the entire contents of which are hereby incorporated by reference to the same extent as if fully rewritten.

BACKGROUND OF THE INVENTION

1. Field of the Invention

The present invention relates to a torque transmission device, in particular for a drive train of a motor vehicle driven by an internal combustion engine. The device includes an input part and an output part having a common axis of rotation, around which the input part and the output part are jointly rotatable and twistable relative to one another to a limited degree, and a spring damper arrangement that has at least one energy store and a friction device and is effective between the input part and the output part.

2. Description of the Related Art

DE 10 2009 035 916 A1 discloses a torsional vibration damper, in particular a dual mass flywheel, including a primary mass and a secondary mass that are coupled to each other with respect to relative rotation between the two by a friction device, which friction device includes a support plate, a support disc, and a diaphragm spring, and wherein multiple tabs are arranged on the inner circumference of the diaphragm spring to improve the centering of the friction device during assembly of the friction device.

In accordance with DE 10 2009 035 916 A1, the dual mass flywheel includes a primary mass and a secondary mass that are rotatable relative to each other against the force of an arc spring assembly. The dual mass flywheel has an axis of rotation. The secondary mass includes arcuate cutouts in which the arc spring assembly is supported. The primary mass has channel-like arcuate expansions in which the arc spring assembly is situated.

In accordance with DE 10 2009 035 916 A1, the friction device damps the relative rotation between the primary mass and the secondary mass by dry friction. The damping device includes a support plate that is firmly connected, for instance riveted, to the primary mass, and a support disc that is fixed with respect to rotation about the axis of rotation relative to the support plate, but is displaceable in the axial direction relative to the support plate. A friction control disc is arranged between the support plate and the support disc. The friction control disc is connected to the secondary mass by teeth so as to be axially displaceable and fixed against relative rotation. The friction control disc is in surface contact with the support plate and with the support disc. Thus rotation of the friction control disc relative to the support plate and relative to the support disc is possible against the dry friction between the contacting surfaces. The support disc is pressed onto the friction control disc and the support plate, respectively, by a diaphragm spring, causing the friction control disc to be clamped between the support plate and the support disc. Fingers of the support disc pass through corresponding openings in the support plate. Likewise, fingers of the diaphragm spring pass through openings of the support plate.

The present invention has as an object providing a torque transmission device of the kind described above having a design that is adapted to/optimized in terms of the installation space.

SUMMARY OF THE INVENTION

In accordance with one aspect of the present invention, the object identified above is attained by a torque transmission device, in particular for a drive train of a motor vehicle driven by an internal combustion engine, including an input part and an output part having a common axis of rotation around which the input part and the output part are each rotatable and are rotatable relative to one another to a limited degree. The device includes a spring damper arrangement that has at least one energy store and a friction device and is effective between the input part and the output part, wherein the friction device is arranged radially outside the at least one energy store.

The terms "input part" and "output part" refer to a torque flow direction starting from a drive device such as an internal combustion engine. "Radial" refers to the axis of rotation. A radial direction is a direction perpendicular to the axis of rotation.

The torque transmission device can be a torsional vibration damper. The torque transmission device can be a dual mass flywheel. The input part of the torque transmission device can be in driving connection with an output part of the internal combustion engine, in particular to a crankshaft. The output part of the torque transmission device can be in driving connection with an input part of a friction clutch, in particular a clutch cover.

The spring damper arrangement can include a spring device. The spring damper arrangement can include a damper device. The spring device and the damper device of the spring damper arrangement can be connected in parallel. The spring device can include at least one energy store. The spring device can include at least one spring. The at least one spring of the spring device can be a coil spring. The at least one spring of the spring device can be a compression spring. The at least one spring of the spring device can be an arc-shaped coil spring. The spring device can include multiple springs, in particular two springs. The springs of the spring device can be arranged around the axis of rotation in an arc-like way. The springs of the spring device can be arranged around the axis of rotation and can be spaced from the axis of rotation by a first radius. The damper device can include the friction device. The friction device can be arranged around the axis of rotation in an annular way. The friction device can be arranged around the axis of rotation and spaced from the axis of rotation by a second radius. The second radius can be greater than the first radius.

The torque transmission device of the invention requires less installation space in the region of the axis of rotation. A reduced normal force or pressing force is required on the friction device. A surface pressure on the friction device is reduced. The friction device is subject to a lower degree of stress.

A pendulum mass carrier part of a centrifugal pendulum device can be connected to the output part to co-rotate with the latter, and the friction device can be effective between the input part and the pendulum mass carrier part. The output part can have a flange part. The output part can include an inertial mass part. The inertial mass part can be firmly connected to the flange part of the output part. The inertial mass part can be riveted to the flange part of the output part. The pendulum mass carrier part can be firmly connected to the inertial mass part. The pendulum mass carrier part can be riveted to the inertial mass part. The pendulum mass carrier part can be rotatable about the axis of rotation together with the output part. The pendulum mass carrier part can have a flange-like shape. The pendulum mass carrier part can have a double-flange shape, including two flange sections that are spaced from each other in the direction of the axis of rotation. At least one pendulum mass that is displaceable relative to the pendulum mass carrier part under the influence of centrifugal forces can be arranged on the pendulum mass carrier part. The at least one pendulum mass can be displaceable along a defined path. The at least one pendulum mass can be displaceable between a first end position and a second end position. The at least one pendulum mass can be arranged on the pendulum mass carrier part to be displaceable with the aid of pendulum rollers. The at least one pendulum mass and/or the pendulum mass carrier part can include pendulum mass roller tracks in which the pendulum masses are arranged. The at least one pendulum mass can be arranged between the two flange sections of the pendulum mass carrier part.

The friction device can include a friction control disc that is in frictional engagement with the input part and connected to the pendulum mass carrier part in a positive-locking way. The friction control disc can include at least one friction surface that frictionally corresponds with the input part. The friction control disc can be of one-piece construction. The friction control disc can be of multipartite construction. Multiple friction control disc parts can be interconnected by a carrier part. The friction control disc or friction control disc parts can include a friction material. The friction material can be a plastic material. The friction material can be flexible, rubber resin bound, elastomeric resin bound, injection-molded, and/or metal-free. The carrier part can be a sheet metal part. The carrier part can have through holes in which the friction control disc parts are received. Thus, the friction control disc can be entrained by the pendulum mass carrier part in a positive locking way, and a frictional relative movement between the friction control disc and the input part is possible. Friction material is saved. The carrier plate facilitates the assembly of the friction elements.

The input part can include a flange part and a cover part, and the friction control disc can be in frictional engagement with the cover part. The flange part can be used as a driving connection between the torque transmission device and the internal combustion engine. The cover part can be firmly connected to the flange part. The cover part can be connected to the flange part in a material-locking way. The cover part and the flange part can be welded to each other. The cover part can be arranged between the flange part and the pendulum mass carrier part, as viewed in the direction of the axis of rotation. The cover part can include a friction surface in frictional contact with the friction control disc. The friction surface of the cover part can face the pendulum mass carrier part. The friction surface of the cover part can face away from the pendulum mass carrier part. A frictional engagement between the friction control disc and the cover part can occur in a plane that is perpendicular to the axis of rotation. The friction control disc can be in frictional engagement with the flange part. A frictional engagement between the friction control disc and the flange part can occur in a plane that is parallel to the axis of rotation.

The friction device can include a friction control disc that is connected to the input part in a positive locking way, and in frictional engagement with the pendulum mass carrier part. The pendulum mass carrier part can be arranged between the input part and the inertial mass part of the output part, as viewed in the direction of the axis of rotation. The pendulum mass carrier part can include a friction surface in frictional correspondence with the friction control disc. The friction surface of the pendulum mass carrier part can face the input part. Thus, the friction control disc can be entrained by the input part in a positive-locking way, and a frictional relative movement between the friction control disc and the pendulum mass carrier part can occur. The input part can include a flange part and a cover part, and the friction control disc can be connected to the cover part in a positive-locking way.

The cover part can have a flange section arranged radially outside the at least one energy store, and the friction device can be arranged on the flange section. The cover part can include a connecting section for connection with the flange part of the input part. The connecting section of the cover part can be arranged radially inside the flange section. The cover part together with the flange part of the input part can delimit a receiving space for the at least one energy store. The receiving space can have a torus-like shape. The receiving space can be arranged radially inside the flange section. The receiving space can be arranged radially inside the connecting section of the cover part. The friction device can frictionally correspond to the flange section.

First stop portions that are effective in a first direction of rotation and second stop portions that are effective in a second direction of rotation can be provided for connecting the friction control disc in a positive-locking way, and the friction control disc can have entrainment sections corresponding to the stop portions. In the first direction of rotation, the entrainment portions can engage with the first stop sections. In the second direction of rotation, the entrainment portions can engage with the second stop portions. The entrainment portions can engage with the stop portions in the circumferential direction of the friction control disc. Thus different stop portions are effective in each direction of rotation. The stop portions can have recesses. The recesses can have marginal-portions. The marginal portions can form the stop portions. The entrainment portions can be provided with extensions. The extensions can be received in the recesses. The extensions can extend into the recesses in the direction of the axis of rotation. The friction control disc can have multiple entrainment portions distributed in the circumferential direction. The friction control disc can include multiple extensions distributed in the circumferential direction. The extensions can be evenly distributed in the circumferential direction.

In accordance with a further embodiment, for the positive connection, the friction control disc can have the stop portions and the pendulum mass carrier part can have the entrainment-portions. The entrainment portions can be riveting heads of a riveting of the pendulum mass carrier part.

The stop portions can be spaced from the entrainment portions in such a way that hysteresis independent of the direction of rotation is created. The stop portions can be spaced from the entrainment portions in the circumferential direction of the friction control disc. The friction control disc can have recesses shaped like elongated holes. The friction control disc can have multiple recesses distributed along the circumferential direction. Each of the recesses can extend in the circumferential direction of the friction control disc. The recesses can have a shape that is curved in correspondence with the circumference of the friction control disc. Each recess can include a first stop portion and a second stop portion. Each recess can include a first end portion and a second end portion. The first end portions of the recesses can form the first stop portions. The second stop portions of the recesses can form the second stop portions. In the entrainment direction the recesses can be larger than the entrainment portions. The entrainment portions can be guided in the recesses. The lengths of the recesses in the entrainment direction can define a predetermined clearance angle. A "clearance angle" is a maximum angular range through which the input part and the output part can be rotated relative to each other upon a change of the direction of rotation, without any entrainment between the stop portions and the entrainment portions, and thus without friction on the friction control disc.

The friction device can include a spring device for loading the friction control disc, and the spring device can be in immediate frictional contact with the friction control disc. The spring device can apply a force or force component in the direction of the axis of rotation. The spring device can apply a normal force to the friction device to generate a frictional force. The spring device can include a diaphragm spring. The spring device can form a support plate. The spring device can have a dual function. A separate support plate can be dispensed with. In this context, a support plate is, in particular, understood to be an element that is displaceable in the direction of the axis of rotation and rotatable relative to the friction control disc, and is used to transmit a pressing force to the friction control disc. The support plate can be connected for co-rotation with the input part, or with the pendulum mass support part.

The friction control disc can cover the pendulum mass carrier part in such a way that the pendulum rollers are fixed. Thus, separate position-securing means for the pendulum rollers can be dispensed with.

In summary, and in other words, among other aspects, the invention relates to a friction device for a dual mass flywheel including a centrifugal pendulum, wherein the friction device is arranged radially above an arc spring channel. The friction device can be mounted between a cover and a primary mass disc. Actuation of the friction device can take place through an elongated hole on a centrifugal pendulum flange. The width of the elongated hole can define a clearance angle of the friction control disc. Due to the radial position (far outward), an axial force of a diaphragm spring, and thus the surface pressure on the friction control disc, can be reduced and a favorable material can be used for the friction control disc.

The friction device can be mounted to the centrifugal pendulum flange. In that case, the friction control disc can be actuated through a recess in the cover. The diaphragm spring for introducing the axial force into the friction control disc can additionally be used as a support plate. To prevent cylinder rollers from falling out of the centrifugal pendulum, the friction control disc can be placed above roller tracks. The friction control disc can be divided into multiple elements to save plastic material. To simplify the positioning of the various individual elements during assembly, they can be assembled in a carrier plate. The friction device can be riveted to the circumference of the cover with multiple lugs. Thus, no additional rivets need to be used during assembly. The friction control disc can be mounted to a cover side. The friction control disc can be divided into multiple individual elements and mounted to a carrier plate. The carrier plate can be used to actuate the friction device through additional ears on the circumference. The diaphragm spring can also act as a cover disc to create a second friction surface. The diaphragm spring can act as a cover disc. The area of contact on the outer diameter of the friction control disc and on the cover can provide an additional friction surface. Thus, even under the influence of centrifugal forces, the friction control disc can be prevented from widening too much. Multiple tabs on the friction control disc can pass through a recess in the cover and into an elongated hole in the centrifugal pendulum flange, and can thus allow the friction device to be actuated. The friction control disc can be actuated through the closing head of a rivet connection centrifugal pendulum/secondary flywheel.

In the following description, exemplary embodiments of the invention will be described in more detail with reference to drawing figures. Further features and advantages will become apparent from the description. Concrete features of these exemplary embodiments may can represent general features of the invention. Features of these exemplary embodiments that are connected to other features may can represent individual features of the invention.

BRIEF DESCRIPTION OF THE DRAWINGS

The diagrammatic drawings include by way of example.

DESCRIPTION OF THE PREFERRED EMBODIMENTS

Figure 1A:
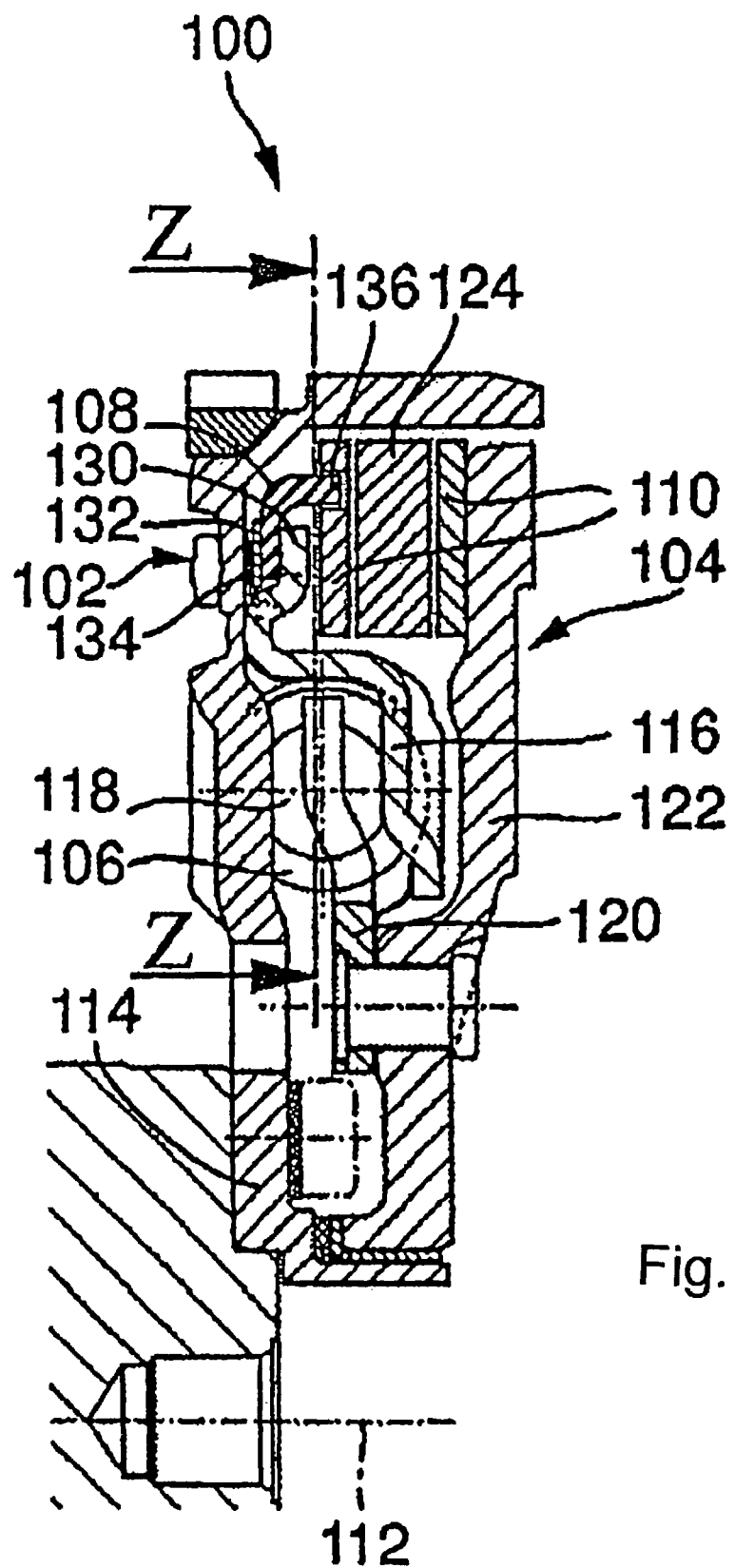
FIGS. 1A and 1B show two cross-sectional views of a dual mass flywheel including an input part, an output part, a spring damper device including arc-shaped springs, a friction device arranged radially outside the arc-shaped springs, and including a friction control disc and a centrifugal pendulum device with a pendulum mass carrier part, wherein the friction control disc is in frictional engagement with the input part and is connected to the pendulum mass carrier part in a positive-locking way.
Figure 1B:
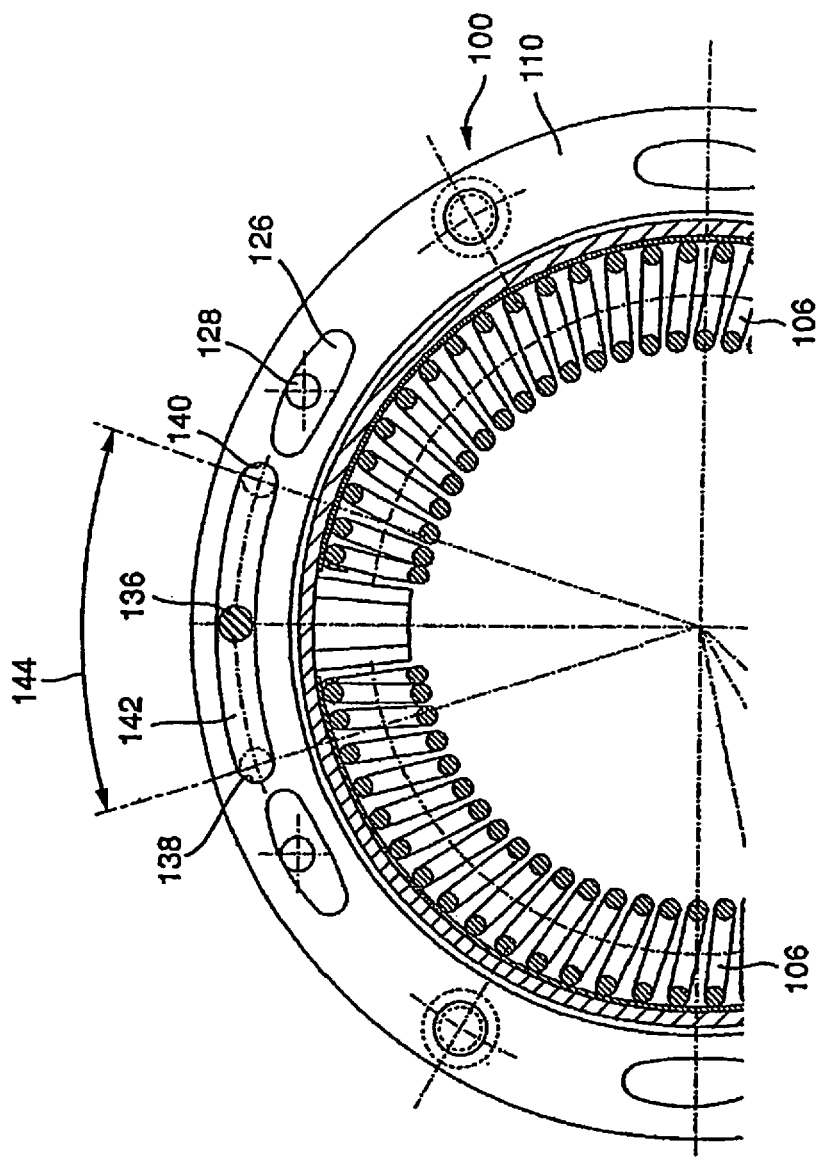

FIGS. 1A and 1B show two cross-sectional views of a dual-mass flywheel 100 including an input part 102, an output part 104, a spring damper device with arc-shaped coil springs such as 106, a friction device arranged radially outside the arc-shaped springs 106. The dual-mass flywheel includes a friction control disc 108 and a centrifugal pendulum device with a pendulum mass carrier part 110, wherein the friction control disc 108 is in frictional engagement with the input part 102 and is connected to the pendulum mass carrier part 110 in a positive-locking way. FIG. 1A is a cross-sectional view along the axis of rotation 112 of the dual mass flywheel 100. FIG. 1B is a sectional view along line Z-Z of FIG. 1A.

The dual mass flywheel 100 is an example of a torque transmission device and is a torsional vibration damper. The dual mass flywheel 100 acts to damp torsional vibrations in an otherwise non-illustrated drive train of a motor vehicle that is driven by an internal combustion engine. Such torsional vibrations are in particular caused by periodic combustion processes in the internal combustion engine and the resultant irregular rotational speed of the crankshaft.

The input part 102 of the dual mass flywheel 100 can be connected with an output shaft of the combustion engine, in particular with a crankshaft, in a way to transmit torque. The output part 104 of the dual mass flywheel 100 can be connected to an input part of a friction clutch in a torque-transmitting way. The input part 102 and the output part 104 are jointly rotatable about the common axis of rotation 112 and are rotatable relative to each other about the axis of rotation 112 to a limited degree.

The input part 102 includes a flange part 114 and a cover part 116. The flange part 114 and the cover part 116 are firmly connected to each other; in the present example they are welded together. The flange part 114 and the cover part 116 axially abut a receiving space 118 that is of torus-like shape. The output part 104 includes a flange part 120, and an inertial mass part 122 is firmly connected, for instance riveted, to the flange part 120. The inertial mass part 122 of the output part 104 is rotatably supported on the flange part 114 of the input part 102. The pendulum mass carrier part 110 of the centrifugal pendulum device is firmly connected, preferably riveted, to the inertial mass part 122. In a double-flange-like way, the pendulum mass carrier part 110 is formed with two flange sections arranged to be next to each other and spaced apart as viewed in the direction of the axis of rotation 112. Pendulum masses such as 124 are arranged between the flange sections of the pendulum mass carrier part 110.

The pendulum masses 124 are arranged on the pendulum mass carrier part 110 so as to be displaceable relative to the pendulum mass carrier part 110. The pendulum masses 124 are pivotable. The pendulum masses 124 are arranged on the pendulum mass carrier part 110 so as to be spaced apart from the axis of rotation 112. The pendulum masses 124 are displaceable on a defined path and between two end positions. In the present example, the centrifugal pendulum device includes three pendulum masses 124. In accordance with another embodiment, the centrifugal pendulum device can include more or fewer pendulum masses, for example two or four pendulum masses. The pendulum mass carrier part 110 is arranged between the cover part 116 of the input part 102 and the inertial mass part 122 of the output part 104 as viewed in the direction of the axis of rotation 112.

The pendulum mass carrier part 110 has through holes such as 126 corresponding to through holes of the pendulum masses 124. Pendulum rollers such as 128 for supporting the pendulum masses 124 in a way to be displaceable along a defined path between the two end positions of through holes 126 are arranged in the through holes 126 of the pendulum mass carrier part 110 and the through holes of the pendulum masses.

The spring damper device is effective between the input part 102 and the output part 104. The spring damper device includes arc-shaped coil springs 106. In the present example, there are two arc-shaped coil springs 106, each of which extends along an approximately semicircular circumferential section of receiving space 118. On one side, the arc-shaped springs 106 are supported on the input part 102; on the other side, the arc-shaped springs 106 are supported on the flange part 120 of the output part 104.

Radially inwardly, the flange part 114 of the input part 102 has a portion that extends in the direction of the axis of rotation 112 and underlies a radially inner portion of the centrifugal pendulum device. Radially outwardly, the cover part 116 of the input part 102 has a flange portion 130. As viewed in the direction of the axis of rotation 112, the flange portion 130 of the cover part 116 is radially spaced from the flange part 114 of the input part 102, forming a receiving space between flange part 114 of input part 102 and flange portion 130 of cover part 116. That receiving space receives the friction device of the spring damper device.

The friction device includes the friction control disc 108, a support plate 132, and a diaphragm spring 134. The support plate 132 is displaceable in the direction of the axis of rotation 112 to a limited degree. The friction control disc 108 is arranged between the flange section 130 of the cover part 116 and the support plate 132. The diaphragm spring 134 is arranged between the flange part 114 and the support plate 132. On one side, the diaphragm spring 134 is supported on the flange part 114 and on the other side the diaphragm spring 134 is supported on the support plate 132. Thus the support plate 132 is loaded by the diaphragm spring in the direction of the friction control disc 108. The diaphragm spring 134 generates a pressing force to press the friction control disc 108 between the flange section 130 of the cover part 116 and the support plate 132. On the friction control disc 108, the pressing force creates a normal force that, taking into account a coefficient of friction, results in a proportional frictional force.

Facing the pendulum mass carrier part 110, the friction control disc 108 includes entrainment portions such as 136. In the present example, the friction control disc 108 includes two diametrically opposed entrainment portions 136. In another embodiment, the friction control disc 108 can have more or fewer entrainment portions. The friction control disc 108 can include one, three, or four entrainment portions, for instance. In the present example, the entrainment portions 136 are formed as axial extensions of circular cross section. The flange portion of the pendulum mass carrier part 110 that is adjacent to the friction control disc 108 has engagement portions such as 138, 140. The engagement portions 138, 140 are defined by respective end portions of elongated hole-like recesses such as 142 in the pendulum mass carrier part 110. The recesses 142 have an arc-like shape corresponding in shape to the circumference of the friction control disc 108. In the lengthwise direction, the recesses 142 extend over an angular range of approximately 30°-45°, in particular of approximately 36°. The width of the recesses 142 in the radial direction approximately corresponds to the radial height of entrainment portions 136. In the present example, the pendulum mass carrier part 110 includes two diametrically opposed recesses 142. In another embodiment, the pendulum mass carrier part 110 can have more or fewer recesses. For example the pendulum mass carrier part can have one, three, or four recesses.

In the direction of the axis of rotation 112 the entrainment portions 136 of the friction control disc 108 extend into the recesses 142 of the pendulum mass carrier part 110. The entrainment portions 136 are guided in the recesses 142. As a function of the direction of rotation, the entrainment portions 136 can alternatingly hit the engagement portions 138, 140. Thus, there is an angle-of-rotation region in which the input part 102 and the output part 104 can be rotated relative to each other without carrying along the friction control disc 108. That angular range is also referred to as a clearance angle 144.

The bearing region between the inertial mass part 122 of the output part 104 and the flange part 114 of the input part 102 is arranged radially inward, relative to and facing the axis of rotation 112. The connection between the flange part 120 and the inertial mass part 122 is arranged in the radially outward direction relative to axis of rotation 112. Following even further outward in a radial direction are the receiving space 118 and the arc-shaped springs 106. Following even further outward in a radial direction, the flange part 114 and the cover part 116 of the input part 102 are connected to each other. Following even further outward in a radial direction are the friction device and the centrifugal pendulum device.

Figure 2:
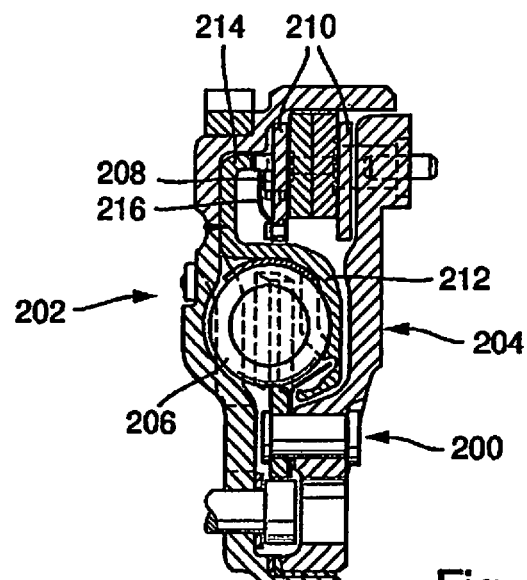
FIG. 2 illustrating a cross-sectional view of a dual mass flywheel including an input part, an output part, a spring damper device including arc-shaped springs, and a friction device arranged radially outside the arc-shaped springs and including a friction control disc and a centrifugal pendulum device with a pendulum mass carrier part, wherein the friction control disc is non-rotatably connected with the input part in a positive-locking way and is in frictional engagement with the pendulum mass carrier part.

FIG. 2 is a cross-sectional view of a second embodiment of a dual-mass flywheel 200 including an input part 202, an output part 204, a spring damper device including arc-shaped coil springs 206, and a friction device arranged radially outside the arc-shaped springs 206. The friction device includes a friction control disc 208 and a centrifugal pendulum device with a pendulum mass carrier part 210, wherein the friction control disc 208 is connected to the input part 202 in a positive-locking way and in frictional engagement with the pendulum mass carrier part 210. The cover part 212 of the input part 202 includes recesses with stop portions in which the entrainment portions of the friction control disc 208 engage. The flange section 214 of the cover part 212 is bent towards the pendulum mass carrier part 210. The recesses with the stop portions are arranged on that border of the cover segment 212 that is oriented toward the pendulum mass carrier part 210. A diaphragm spring 216 is connected, in the present example riveted, to that flange portion of the pendulum mass carrier part 210 that faces the input part 202. The diaphragm spring 216 simultaneously functions as a support plate. The friction control disc 208 covers that flange portion of the pendulum mass carrier part 210 that faces the input part 202 in such a way that pendulum rollers of the pendulum mass carrier element are prevented from falling out. The pendulum rollers of the centrifugal pendulum device are fixed with the aid of the friction control disc. For further functional details, refer in particular to FIG. 1 and the associated description.

Figure 3:
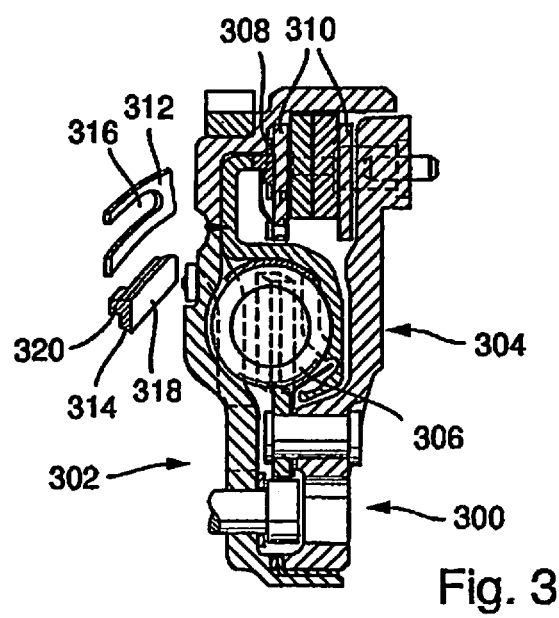
FIG. 3 illustrating a cross-sectional view of a dual mass flywheel including an input part, an output part, a spring damper device including arc-shaped springs, and a friction device arranged radially outside the arc-shaped springs and including a friction control disc and a centrifugal pendulum device with a pendulum mass carrier part, wherein the friction control disc is embodied as a carrier plate with friction elements.

FIG. 3 is a cross-sectional view of a third embodiment of a dual mass flywheel 300, including an input part 302, an output part 304, a spring damper device including arc-shaped coil springs 306 and a friction device arranged radially outside the arc-shaped springs 306. The friction device includes a friction control disc 308 and a centrifugal pendulum device with a pendulum mass carrier part 310, wherein the friction control disc 308 is embodied as a carrier plate 312 with friction elements 314. The carrier plate 312 is shaped like an annular disc and has recesses such as 316. The friction elements 314 are inserted into the recesses 316. The recesses 316 are shaped like elongated holes. Each friction element 314 has a friction portion 318 and an attachment portion 320. For further functional details, refer in particular to FIG. 1 and the associated description.

Figure 4:
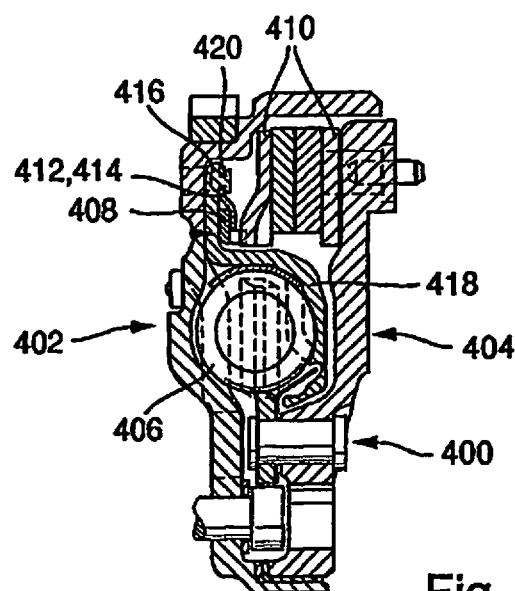
FIG. 4 illustrating a cross-sectional view of a dual mass flywheel including an input part, an output part, a spring device including arc-shaped springs, and a friction device arranged radially outside the arc-shaped springs and including a friction control disc and a centrifugal pendulum device with a pendulum mass carrier part, wherein the friction control disc is held by a diaphragm spring riveted to the input part.

FIG. 4 is a cross-sectional view of a dual mass flywheel 400, including an input part 402, an output part 404, a spring damper device including arc-shaped coil springs 406, and a friction device arranged radially outside the arc-shaped springs 406. The friction device includes a friction control disc 408 and a centrifugal pendulum device with a pendulum mass carrier part 410, wherein the friction control disc 408 is held by a diaphragm spring 412 riveted to the input part 402. The diaphragm spring 412 simultaneously functions as a support plate 414. The diaphragm spring 412 is connected, in the present example riveted, to a flange portion 416 of a cover part 418 of the input part 402. The riveting is arranged on the radially outer marginal section of the flange portion 416. For riveting purposes, pins 420 protruding towards the pendulum mass carrier part 410 are arranged on the marginal section of the flange portion 416. The pins 420 are part of the flange portion 416. For assembly purposes, the pins 420 are placed in through holes of the diaphragm spring 412 and the free ends of the pins 420 are deformed to connect the diaphragm spring 412 with the flange portion 416. Thus, no separate rivets are required. Recesses with stop portions are provided on that flange portion of the pendulum mass carrier part 410 that faces the input part 402. For further functional details, refer in particular to FIG. 1 and the associated description.

Figure 5:
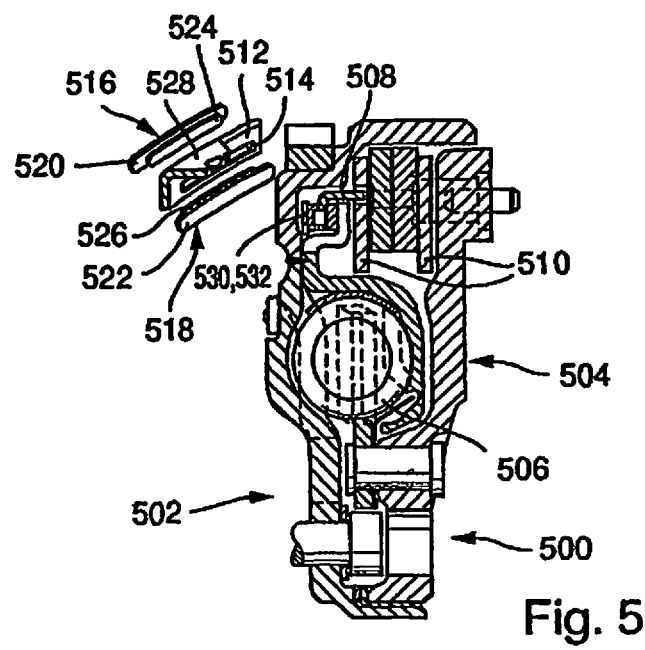
FIG. 5 illustrating a cross-sectional view of a dual mass flywheel including an input part, an output part, a spring device including arc-shaped springs, and a friction device arranged radially outside the arc-shaped springs and including a friction control disc and a centrifugal pendulum device with a pendulum mass carrier part, wherein the friction control disc is embodied as a carrier plate with friction elements that are effective on two sides.

FIG. 5 is a cross-sectional view of a dual mass flywheel 500, including an input part 502, an output part 504, a spring damper device including arc-shaped coil springs 506 and a friction device arranged radially outside the arc-shaped springs 506. The friction device includes a friction control disc 508 and a centrifugal pendulum device with a pendulum mass carrier part 510, wherein the friction control disc 508 is embodied as a carrier plate 512 with friction elements that are effective on two sides of carrier plate 512. The carrier plate 512 is shaped like an annular disc and has recesses such as 514. The friction elements are arranged in the recesses 514. The recesses 514 are shaped like elongated holes. Each friction element includes two friction element parts 516, 518. Each friction element part 516, 518 has a friction portion 520, 522 and an attachment portion 524, 526. For assembly purposes, the attachment portions 524, 526 of the friction element parts 516, 518 are joined at the recesses 514 in such a way that they are held in the recesses 514. Thus each friction element part 516, 518 has two respective friction sides 520, 522. The friction control disc 508 is suitable for two-sided frictional contact. Recesses with stop portions are arranged on that flange portion of the pendulum mass carrier part 510 that faces the input part 502. The carrier plate 512 has axial extensions directed toward the flange portion of the pendulum mass carrier part 510. Those axial extensions define entrainment portions 528. The diaphragm spring 530 simultaneously acts as a support plate 532. For further functional details, refer in particular to FIG. 1 and the associated description.

Figure 6:
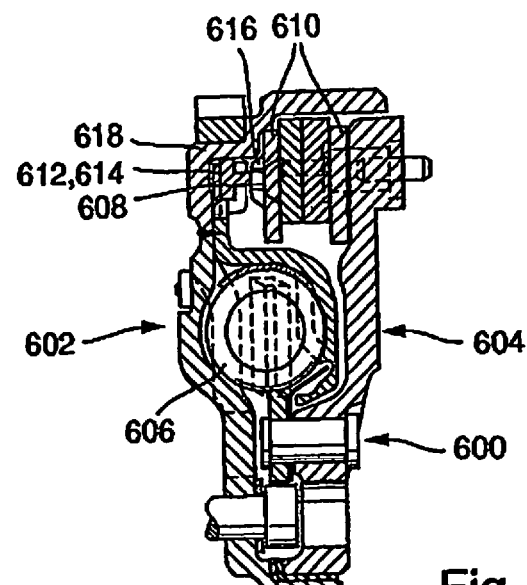
FIG. 6 illustrating a cross-sectional view of a dual mass flywheel including an input part, an output part, a spring device including arc-shaped springs, and a friction device arranged radially outside the arc-shaped springs and including a friction control disc and a centrifugal pendulum device with a pendulum mass carrier part, wherein a diaphragm spring is provided as a support plate.

FIG. 6 is a cross-sectional view of a dual mass flywheel 600, including an input part 602, an output part 605, a spring damper device including arc-shaped coil springs 606, and a friction device arranged radially outside the arc-shaped springs 606. The friction device includes a friction control disc 608 and a centrifugal pendulum device with a pendulum mass carrier part 610, wherein a diaphragm spring 612 is provided as a support plate 614. Recesses with stop portions are provided on that flange portion of the pendulum mass carrier part 610 that faces the input part 602. The pendulum mass carrier part 610 that faces input part 602 includes axially-directed portions 616 that protrude in the direction of the input part 602 in a tab-like manner. These portions 616 include the recesses with the stop portions. In the radial direction, the friction control disc 608 is in frictional contact with the flange part 618 of the input part 602. Thus, movement of the friction control disc 608 under the influence of centrifugal forces can be limited or prevented. For further functional details, refer in particular to FIG. 1 and the associated description.

Figure 7:
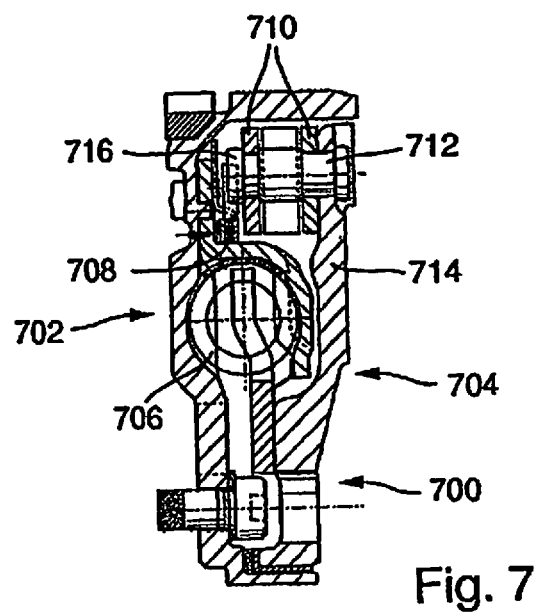
FIG. 7 illustrating a cross-sectional view of a dual mass flywheel including an input part, an output part, a spring device including arc-shaped springs, and a friction device arranged radially outside the arc-shaped springs and including a friction control disc and a centrifugal pendulum device with a pendulum mass carrier part, wherein a positive connection is established between the friction control disc and the pendulum mass carrier part with the aid of rivets.

FIG. 7 is a cross-sectional view of a dual mass flywheel 700, including an input part 702, an output part 704, a spring damper device including arc-shaped coil springs 706 and a friction device arranged radially outside the arc-shaped springs 706. The friction device includes a friction control disc 708 and a centrifugal pendulum device with a pendulum mass carrier part 710, wherein a positive connection is established between the friction control disc 708 and the pendulum mass carrier part 710 with the aid of rivets such as 712. The rivets 712 act to connect the flange portions of the pendulum mass carrier part 710, as well as of the pendulum mass carrier part 710, with the inertial mass part 714 of the output part 704. Each rivet 712 has a rivet head 716, such as a closing head, directed towards the input part 702. The rivet heads 716 form entrainment portions. The friction control disc 708 has recesses with stop portions. For further functional details, refer in particular to FIG. 1 and the associated description.

What is claimed is:

1. A torque transmission device for a drive train of a motor vehicle driven by an internal combustion engine, said torque transmission device comprising:
    an input part and an output part having a common axis of rotation around which the input part and the output part are jointly rotatable and are rotatable relative to one another,
    a pendulum mass carrier part of a centrifugal pendulum device connected for co-rotation with the output part, wherein the centrifugal pendulum device is axially and radially spaced from the input part,
    a spring damper arrangement for damping torsional vibrations in the drive train and including at least one energy storage device,
    an axially operating friction device that is effective to frictionally damp relative rotation between the input part and the output part, wherein the friction device is arranged radially outside the at least one energy storage device and is positioned between and is in surface-to-surface contact with the input part and with the pendulum mass carrier part, and
    an axially acting spring carried by one of the input part and the pendulum mass carrier part and that acts against and axially biases the friction device against the other of the input part and the pendulum mass carrier part.

2. The torque transmission device in accordance with claim 1, wherein the friction device includes a friction control disc in frictional engagement with the input part and is non-rotatably connected to the pendulum mass carrier part.

3. The torque transmission device in accordance with claim 2, wherein the input part includes a flange part and a cover part between which the at least one energy storage device is positioned, and wherein the friction control disc is in frictional engagement with the cover part.

4. The torque transmission device in accordance with claim 3, wherein the cover part includes a radially extending flange section arranged radially outside the at least one energy storage device, and wherein the friction device is arranged on the flange section.

5. The torque transmission device in accordance with claim 2,
    wherein the axially acting spring is in direct frictional contact with the friction control disc.

6. The torque transmission device in accordance with claim 1, wherein the friction device includes a friction control disc that is non-rotatably connected to the input part and is in frictional engagement with the pendulum mass carrier part.

7. The torque transmission device in accordance with claim 1, wherein the input part includes a flange part and a cover part, and wherein the friction device includes a friction control disc that is non-rotatably connected to the cover part.

8. The torque transmission device in accordance with claim 1, wherein the friction device is of annular form.

9. The torque transmission device in accordance with claim 8, wherein the friction device is an annular disc that includes oppositely facing, radially extending friction surfaces.

10. The torque transmission device in accordance with claim 8, wherein the friction device includes a plurality of circumferentially spaced friction elements.

11. The torque transmission device in accordance with claim 10, wherein the circumferentially spaced friction elements are arranged in recess formed in a carrier plate that is arranged between the input part and the pendulum mass carrier part.

12. The torque transmission device in accordance with claim 11, wherein the friction elements include pairs of friction element parts having respective oppositely-facing friction surfaces.

13. The torque transmission device in accordance with claim 1,
    wherein the pendulum mass carrier part includes first and second axially spaced annular flange portions between which at least one pendulum mass is arranged for displacement along an arc having a center lying on the common axis of rotation, and
    wherein the first annular flange portion is positioned on the input part side of the at least one pendulum mass and the second annular flange portion is positioned on the output part side of the at least one pendulum mass.

14. A torque transmission device for a drive train of a motor vehicle driven by an internal combustion engine, said torque transmission device comprising:
    an input part and an output part having a common axis of rotation around which the input part and the output part are jointly rotatable and are rotatable relative to one another,
    a pendulum mass carrier part of a centrifugal pendulum device connected for co-rotation with the output part,
    a spring damper arrangement that has at least one energy storage device,
    a friction device that is effective between the input part and the output part, wherein the friction device is arranged radially outside the at least one energy storage device and is effective between the input part and the pendulum mass carrier part, wherein the friction device includes a friction control disc in frictional engagement with the input part and includes entrainment portions connected to the pendulum mass carrier part in a positive-locking way,
    wherein the pendulum mass carrier part includes recesses having first stop portions effective in a first direction of rotation, and second stop portions effective in a second direction of rotation to receive the entrainment portions of the friction control disc and to non-rotatably connect the friction control disc with the pendulum mass carrier part.

15. The torque transmission device in accordance with claim 14, wherein the first and second stop portions are spaced from the entrainment portions so that hysteresis independent of the direction of rotation is created.

* * * * *